United States Patent [19]
Traub et al.

[11] 3,939,426
[45] Feb. 17, 1976

[54] METHOD AND ARRANGEMENT FOR FURNISHING AN INDICATION OF MULTIPATH RECEPTION IN AN FM RECEIVER

[75] Inventors: Karl Traub, Furth; Günther Benecke, Nurnberg, both of Germany

[73] Assignee: Grundig E.M.V. Elektro-Mechanische Versuchsanstalt Inh. Max Grundig, Furth, Bavaria, Germany

[22] Filed: Oct. 30, 1970

[21] Appl. No.: 85,506

[30] Foreign Application Priority Data
Oct. 20, 1969 Germany............................ 1952739

[52] U.S. Cl. .............................................. 325/363
[51] Int. Cl.² ........................................... H04B 1/06
[58] Field of Search ........... 325/42, 45, 65, 67, 344, 325/345, 347, 349, 351, 363, 472, 474, 476, 473; 340/170, 171; 343/14, 17.2, 17.5; 179/15 BT, 1 G

[56] References Cited
UNITED STATES PATENTS

| 2,952,768 | 9/1960 | Caler et al. ............................ 325/67 |
| 3,104,356 | 9/1963 | Hedger ................................ 325/348 |
| 3,213,198 | 10/1965 | Claras et al. ........................ 179/1 G |
| 3,296,532 | 1/1967 | Robinson ............................ 325/305 |

Primary Examiner—Albert J. Mayer
Attorney, Agent, or Firm—Michael J. Striker

[57] ABSTRACT

Received signal is filtered by a filter tuned to a predetermined harmonic of the modulation frequency lying outside of the modulation region of the received signal. Such harmonic results from modulation distortion due to multipath reception. Output of filter is irregularly occurring pulse sequence which is converted to a constant signal which in turn energizes an indicator.

7 Claims, 5 Drawing Figures

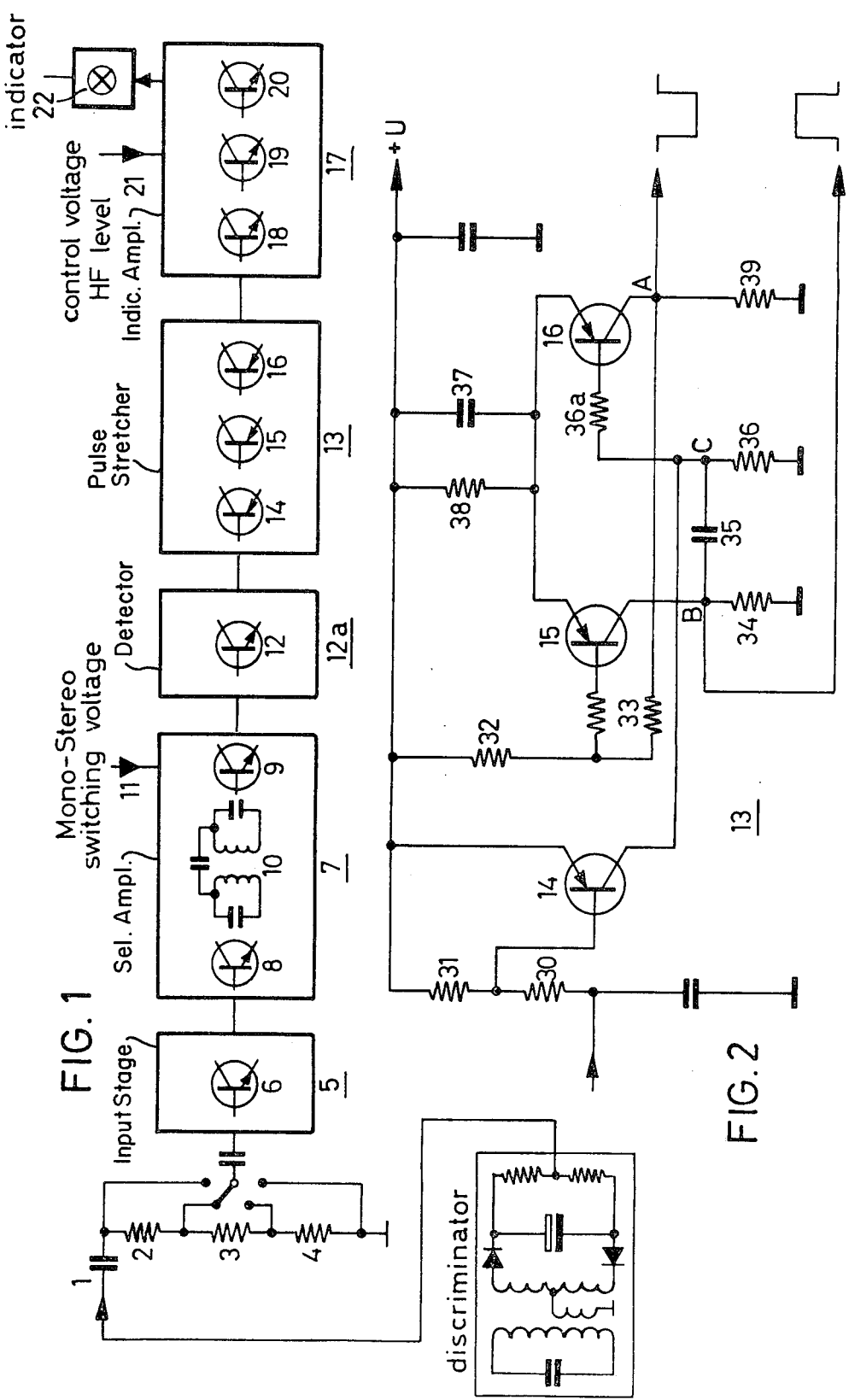

METHOD AND ARRANGEMENT FOR FURNISHING AN INDICATION OF MULTIPATH RECEPTION IN AN FM RECEIVER

BACKGROUND OF THE INVENTION

This invention relates to a method and arrangement for indicating multipath reception in a high frequency receiver receiving frequency modulated mono and/or stereophonic signals. In such a receiver, a frequency discriminator has an output from which, because of modulation distortion resulting from multipath reception, a signal indicating such multipath reception may be derived.

A known solution to this problem is based on phase modulation resulting from multipath reception. Such multipath reception causes a phase variation which results in a greater low frequency output voltage from the ratio detector then does the maximum frequency variation of 75 kHz present in the transmitted signal.

However, in the above-mentioned type of arrangement, phase modulation resulting from pulse interference and through remainders of AM signal which are not sufficiently suppressed when the input voltages are small, are also indicated. This indication results for all frequencies which lie within the transmission band (0 to at least 53 kHz).

Another known method utilizes the amplitude modulation resulting from multipath reception. In this method, care must be taken that the synchronous characteristic amplitude modulation resulting from damping in the intermediate frequency amplifier during the transmission of frequency modulated oscillations does not enter into the indication. This means that the intermediate frequency amplifier must have a constant amplification at least within the region of the modulation spectrum.

It is a disadvantage of the above-explained method that AM interference is indicated which is not caused by multipath reception. Furthermore, if the indicator is to indicate the degree of modulation resulting from multipath amplitude modulation, a variable gain amplifier must precede the indicator. This variable gain amplifier must furnish a substantially constant output voltage for rectification of input voltages ranging from the smallest to the largest possible VHF antenna voltage. In simpler indicating circuits which do not indicate the intensity of the multipath amplitude modulation, the low frequency voltage required for the indicator is generally derived by rectification from each stage of the intermediate frequency amplifier. The resulting low frequency voltages are then furnished to the indicator by way of an adder. Thus the indicator is effective over the whole range of antenna input voltages.

SUMMARY OF THE INVENTION

In the method and arrangement of the present invention, it is assumed that the radiated modulation signal for monaural reproduction emcompasses the usual range of at the most zero to 15 kHz and for stereo reproduction the range of 0 to 15 kHz, 23 to 53 kHz, and including a pilot tone of 19 kHz. The modulation signal is distorted through phase modulation resulting from the simultaneous presence of signals received both on the direct path and in the indirect path. The mono or stereo receiver which receives the frequency modulated signals has a frequency discriminator. A signal is filtered from this discriminator which lies outside of the modulation region of the received signal and is a harmonic of a modulation frequency. This harmonic usually and preferably appears as an irregular pulse sequence. This irregular pulse sequence is converted to a substantially steady signal which indicates the modulation distortion resulting from multipath reception on an indicator.

In theory, any harmonic which is not within the region of the modulation band being transmitted, may be used for this purpose. That is, any harmonic lying between 15 and 18 kHz, 20 through 23 kHz and above 53 kHz, may be utilized for this purpose.

Since a multipath indicator in accordance with the present invention would only be used for extremely high quality, modern hi-fi receivers, it can further be assumed that an AM suppression of more than 60 dB, a characteristic coefficient of non-linear distortion of less than 0.5% as well as a negligible characteristic phase modulation resulting through amplitude modulation, is present in the equipment. Under these conditions, the method and arrangement of the present invention has a number of advantages:

The low frequency signals appearing at the output of the FM demodulator in the empty frequency ranges almost always are the result of distortion due to multipath reception. The magnitude of these signals is therefore a direct measure of the subjective effect and the strength of the perceived distortion.

The indicator can be made sufficiently sensitive that, for a correct amplification, distortions through multipath reception of approximately 1% can be indicated, that is, the indication approaches that of the coefficient of non-linear distortion of the receiver itself.

The distortion, which increases with increasing difference between the direct and the indirect path length, also increases proportionally with the modulation frequency. Therefore, the amount of distortion is dependent upon the height of the modulation frequency. Therefore, for a small difference in path length between the direct and the indirect path and during the transmission of low to medium modulation frequencies, no perceivable distortion results. Therefore, the filtering of harmonics of higher frequencies which fall into the gaps in the modulation frequency spectrum, cause an indication which corresponds to the actual perceived distortion.

If, as is the case in high quality receivers, the low frequency output voltage of the discriminator remains constant for a predetermined range of antenna signals ranging from the smallest to the largest signal to be received, then the interference voltage caused by multipath reception may be compared to the normal low frequency of the output voltage of the discriminator and the percentage of interference voltage may be indicated as a coefficient of distortion on suitable indicator means.

Since the signal which is to furnish the indication is derived from the output of the frequency discriminator, the high frequency part of the receiver (intermediate frequency) is left untouched. The arrangement in accordance with this invention can be packaged as a unit and can be inserted into any suitable receiver.

The indicator signal is derived prior to de-emphasis or to the stero decoder, so that a relatively high signal to noise level exists for the subsequent high amplification. If this were not the case, the amplification of the indicator amplifier would have to be considerably higher, for example for 17 kHz it would have to be approximately 15 dB higher. Furthermore, corresponding to the de-emphasis curve, the selection between, for example, 17 kHz and 8.5 kHz, would be worsened. This would have to be at least 60 dB for an indication of a 1% coefficient of distortion.

Since the degree of distortion is increased for stereo reception relative to monaural reception, the indicator sensitivity can be increased automatically when stereo reception is being used, so that the indication coincides with the different distortion reception occuring between "mono" and "stereo" reception. Furthermore, the indicator circuit can be controlled by the received field strength in such a manner that for very weak field strength, the indicator does not operate. The indicator may also be prevented from operating in the presence of noise or interference frequencies occurring between the transmitted frequencies. Furthermore, the indicator sensitivity may be made dependent upon exact tuning to the carrier of the received signal thereby preventing distortion due to mis-tuning to the erroneously indicated as multipath reception.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a block diagram of an arrangement, in accordance with the present invention;

FIG. 2 is a circuit showing pulse stretchers, in accordance with the present invention;

DESCRIPTION OF THE PREFERRED EMBODIMENTS

Figure 3:
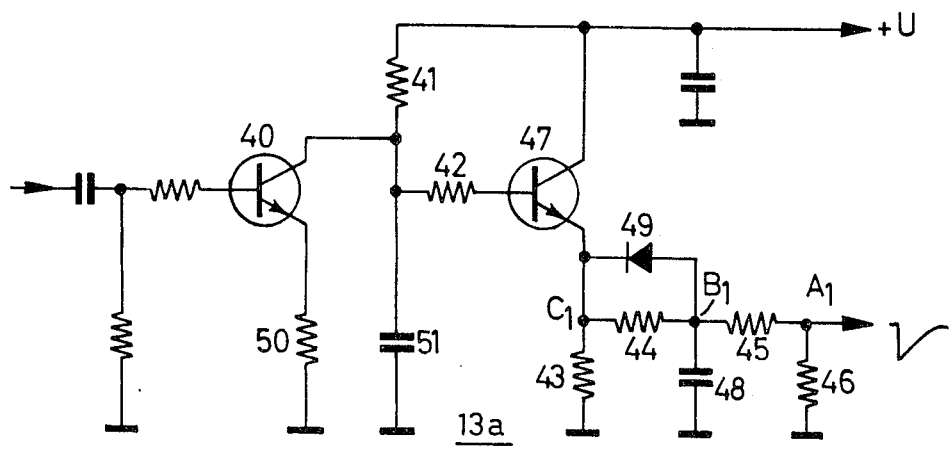
FIG. 3 shows another embodiment of a pulse stretcher.

The preferred embodiments of the present invention will now be described with reference to the drawing.

FIG. 1 shows a first voltage divider means comprising a resistor 2, 3 and 4, which are connected to the output of a frequency discriminator (not illustrated), via a capacitor 1. This voltage divider permits a selection of sensitivity for the circuit. A high input impedance stage 5 having a transistor 6 is connected to the output of the voltage divider by means of a capacitor. This stage has a high input impedance to prevent loading of the voltage divider and the output of the frequency discriminator. It is shown in more detail in FIG. 5. As this Figure illustrates, it comprises a transistor 6 having a collector connected to the positive supply terminal, an emitter connected to a reference potential, as for instance, ground, by means of a resistor. A voltage divider is connected from the positive to the reference terminal and has a voltage divider tap which is connected via a capacitor to the emitter of transistors 6 and by means of two series resistors to the base of transistor 6. The output of the voltage divider is fed to the common point of these two resistors by means of a capacitor.

Figure 5:
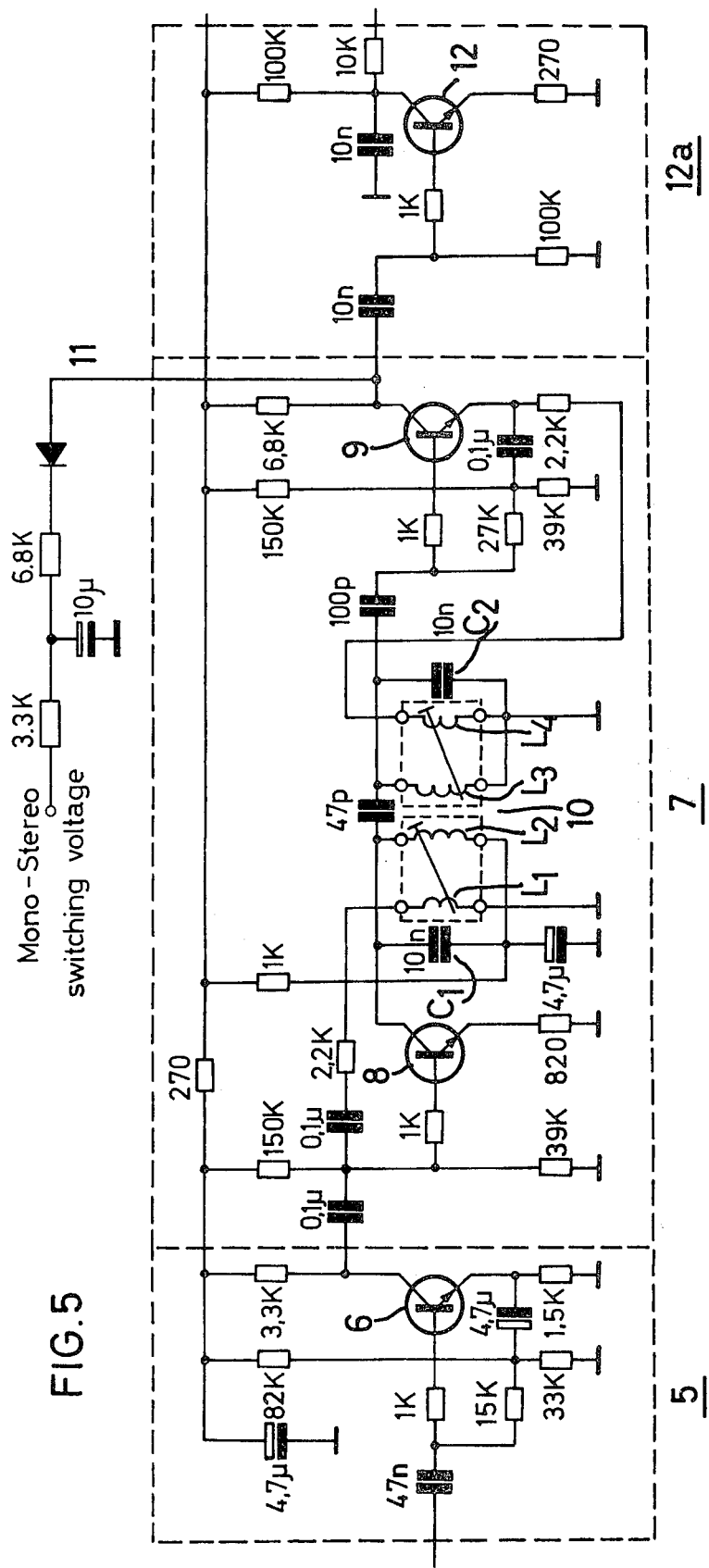
FIG. 5 is a circuit diagram showing the high input impedance stage 5, the selective amplifier 7 and detector 12a as shown in FIG. 1.

The output of stage 5 is derived from the collector of transistor 6 and is fed to a selective amplifier stage 7. This amplifier, whose detailed circuit diagram is also shown in FIG. 5, serves to filter the 17 kHz harmonic which appeared due to multipath reception from the remainder of the signal and also serves to amplify this harmonic. The selection is accomplished by a selector filter 10. This filter comprises two parallel resonant circuits comprising, respectively, a capacitor $C_1$ and an inductor $L_2$, and a capacitor $C_2$ and an inductor $L_3$. These are connected by means of a capacitor. Both resonant circuits are tuned to a frequency of 17 kHz. Further present are inductivities $L_1$ and $L_4$, respectively, representing feedback coils deriving their signals from the first and second resonant circuits. Specifically, coil $L_1$ is connected from ground via a resistance and a capacitor to the tap of a voltage divider connected from the positive terminal to ground. The base of transistor 8 is connected to this tap by means of a resistance, while its emitter is connected to ground via another resistance. The resistance values indicated on this and other drawings represent values found to operate satisfactorily in one particular embodiment but are not meant to limit the invention in any way.

Coil $L_4$ is connected from ground to the emitter of a transistor 9 via a resistance. The base of transistor 9 is connected to the tank circuit of capacitor $C_2$ and inductance $L_3$ via a resistance and a capacitor, while the common point of said resistor and said capacitor is connected via a resistance to the voltage tap of still another voltage divider whose voltage divider tap is also connected to the emitter of transistor 9 via a capacitor. The collector of transistor 9 is connected to the positive terminal by means of a resistance. The mono/stereo switching voltage is applied to a collector of transistor 9. The high selection resulting from the use of amplifier 7 is required in order to prevent the operating frequencies (0–15 kHz, 19kHz, 23–53 kHz) from activating the multipath reception indicator. Further, the amplification of transistor 9 is increased by means of the mono/stero switching voltage applied at 11, in order to increase the sensitivity automatically for stereo reception.

The output signal is taken from the collector of transistor 9 and fed to stage 12a which, as shown in FIG. 5, comprises a detector stage which generates a DC voltage from the 17 kHz oscillations. This DC voltage is applied to pulse stretcher stage 13. It is the function of this pulse stretcher stage to prevent flickering of the indicator lamp during multipath reception. Since distortion during multipath reception is a function of frequency deviation, the 17 kHz oscillations tend to appear as only very short pulses during reception of for example speech or musical selections. The pulse stretcher stage 13 is so constructed that each pulse starts the pulse stretching anew. Thus for a pulse sequence with sufficiently high repetition frequency, the indicator lamp will glow steadily, while for short individual pulses, the lamp will light for a time determined by the pulse stretch stage. The particular embodiments of two pulse stretch stages will be described in detail below.

The pulse stretcher stage 13 is followed by the switching and indicator amplifier 17 which comprises transistors 18, 19 and 20 and operates as a trigger circuit which only becomes operative when a DC voltage 21 causes the transistor 19 to be blocked. This, as previously explained, avoids having a multipath indication resulting from noise or interference frequencies during low high frequency received signal levels. A lamp 22 is arranged in the output circuit of transistor 20. This lamp serves as indicator.

Pulse stretcher stages of conventional design generally are embodied in monostable multivibrators which are switched to the unstable state by an input pulse and furnish at their output a rectangular pulse of predetermined length. Pulses which are applied to the input while the monostable multivibrator is in the unstable state do not exert any influence upon the length of the output pulse.

Even when the input pulses have a rapid repetition rate, the multivibrator returns into its stable state after a time interval determined by its own time constant and can only be switched back into the unstable state after another determined time interval depending upon its operating conditions.

For the present invention, it is desirable to construct a multivibrator which furnishes an output pulse of predetermined length in response to a short input pulse and which further is reset to the beginning of the time interval in the unstable state by each pulse reaching its input while it is in said unstable state. Therefore, if the pulse repetition frequency is greater than the inverse of the time interval for which the multivibrator is in the unstable state, the multivibrator will remain in the unstable state throughout the whole pulse sequence and will furnish a steady output signal for a time equal to the duration of the pulse sequence increased by the time interval in which the multivibrator is in the unstable state.

One embodiment of such as pulse stretcher stage is shown in FIG. 2. FIG. 2 shows a circuit embodying a pulse stretch stage 13 (FIG. 1). The circuit shown in FIG. 2 has a first pnp transistor 14 to whose base the pulses are applied and a collector connected to the circuit point C which is one node of a $\tau$ section whose legs are resistors 34 and 36 and whose transverse member is a capacitor C which connects node C to node B. The emitter of transistor 14 is connected to the positive terminal of the power supply. Transistor 14 is hereinafter referred to as the third transistor and constitutes part of additional circuit means. A transistor 15, hereinafter referred to as a first transistor, has its collector connected to node B, its emitter connected to the positive terminal via a resistance 38 in parallel with a capacitance 37, while its base is connected to the positive terminal via a resistance 32 and via a resistance 33 to the output terminal denoted by A in FIG. 2. Further connected to this output terminal is the collector of the transistor 16 whose emitter is connected directly to the emitter of transistor 15. Transistor 16 is herein referred to as the second transistor. The output terminal A is connected to ground via a resistance 39. The base of transistor 16 is connected to terminal C via a resistance 36a.

In the quiescent condition, pnp transistor 16 is conductive, since transistor 14 is blocked and the base of transistor 16 is connected to ground via resistance 36 and 36a. The collector voltage of transistor 16 (ptA) is then at a voltage only slightly less than the common emitter voltage of transistors 15 and 16. Thus the base voltage of transistor 15 is positive relative to the emitter voltage, since this base voltage is derived from the voltage divider 32,33. Transistor 15 is blocked. A DC voltage appears at point A whose magnitude is determined by the relationship of resistors 38 and 39. Point B is connected to ground via resistance 34. If positive pulses or 17 kHz oscillations of sufficient amplitude are applied to the base of transistor 12 which is operating as a detector (FIG. 1), then this transistor becomes conductive causing pnp transistor 14 to become conductive also due to its base connection to resistors 30 and 31 which are in the collector circuit of transistor 12. Condenser 35 is then charged to the operating voltage via transistor 14 and transistor 16 is blocked. The collector of transistor 16 (point A) is thus switched to essentially ground potential causing transistor 15 to be blocked via resistor 33. The voltage appearing at that point, point B, is a DC voltage whose magnitude in the symmetrical multivibrator shown in this Figure is again determined by the relationship of resistors 39 and 38. After the input pulses have ceased (or the 17 kHZ oscillations have stopped), transistor 14 is again blocked and capacitor 35 discharges via resistance 36 until the voltage across it is such that transistor 16 becomes conductive and the multivibrator switches back to its stable state. If however pulses or 17 kHz oscillations re-occur while the multivibrator is still in the unstable state (that is, during the discharge phase of capacitor 35), then capacitor 35 is recharged to the operating voltage and the pulse stretching process begins anew. The duration of the output pulse is derived, for example, from point A depends first upon the RC time constant (35/36) and further upon the base voltage required to cause transistor 16 to become conductive. The latter is determined by the emitter voltage which, for a conductive transistor 15, depends upon the relationship of the resistors 34 and 38. The lower the ratio of resistor 34 to resistor 38, the longer the length of the output pulses.

Pulses of negative polarity may be derived from circuit point A of FIG. 2, but positive pulses may be derived from point B of FIG. 2.

FIG. 3 shows a pulse stretching circuit which meets all the above requirements but requires considerably less equipment. However, this circuit does not furnish rectangular pulses at its output. Therefore, it is necessary that the indicator amplifier is a trigger circuit. This however does not actually require additional equipment since a trigger circuit is already available in the indicator amplifier in order to achieve the control of the indicator circuit based on the high frequency level of the received signal. This will be described further below.

FIG. 3 shows this above-described circuit. It comprises a first npn transistor 40 which operates as a detector. The pulses at 17 kHz oscillations are applied to its base, its emitter is connected to ground potential via a resistor 50, while its collector is connected to the positive terminal of the supply voltage via a resistance 41 and is further connected to the base of a second npn transistor 47 via a resistance 42. The collector of the transistor 47 is directly connected to the positive voltage terminal, while its emitter is connected to a first node $C_1$ of a $\tau$ section comprising a diode 49 in parallel with a resistance 44 connecting the two legs comprising respectively a resistance 43 and a capacitor 48.

As mentioned above, transistor 40 operates as a detector, while transistor 47 operates as an emitter-follower stage. In the absence of a signal at its base, transistor 40 is blocked and transistor 47 is conductive so that capacitor 48 charges to a percentage of the emitter voltage of the transistor 47 determined by the ratio of resistors 44,45 and 46. If now a 17 kHz oscillation of sufficient amplitude is applied to the base of transistor 40, transistor 40 becomes conductive, transistor 47 blocks, and capacitor 48 discharges with a very short time constant via diode 49 and the low emitter output impedance of transistor 47. At the end of the oscillation or pulse at the input of transistor 40, this transistor again blocks causing transistor 47 to become conductive so that capacitor 48 charges via the high ohmic resistance 44, diode 49 now being in the blocked direction. Therefore, a pulse appears at output $A_1$ which is a negative pulse having a relatively steep leading edge and a slowly increasing trailing edge. This pulse must be converted into an exact switching pulse by the subsequent trigger circuit in the indicator amplifier. The length of these switching pulses depends upon the size of capacitor 48 and of resistors 44,45 and 46, the input resistance of the trigger circuit, the relationship of these various resistors, as well as upon the operating voltage and the sensitivity of the trigger. Since each input pulse occurring during the charging phase of capacitor 48 causes this capacitor to discharge again, the requirement is met that each incoming pulse starts the pulse stretching process over again.

The circuits shown in FIGS. 2, 3 and 5 need of course not be restricted to the particular types of transistors shown.

Figure 4:
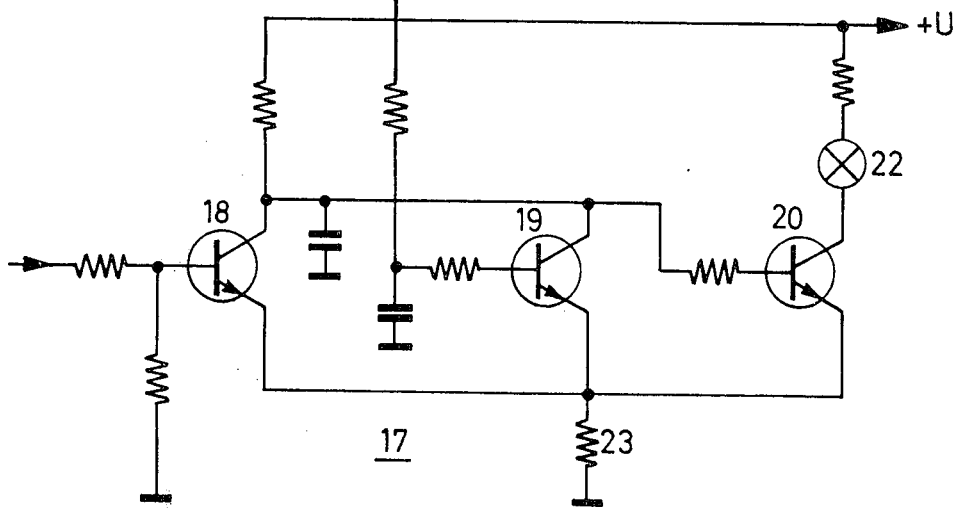
FIG. 4 is a circuit diagram of the switching and indicator amplifiers.

FIG. 4 is a circuit diagram showing the switching and indicator amplifier 17 (FIG. 1). Transistors 18,19 and 20 are connected to the reference or ground potential via a common emitter resistance 23. A voltage 21, which depends upon the level of the high frequency received signal, is applied to the base of transistor 19. This transistor is blocked when the voltage 21 is of sufficient magnitude. Transistor 18 is conductive in the quiescent condition, transistor 20 is blocked, and indicator lamp is extinguished. When a negative pulse as derived from point A of the circuit shown in FIG. 2 is applied to the base of transistor 18, this transistor is blocked causing transistor 20 to become conductive and the indicator lamp to light.

While the invention has been illustrated and described as embodied this specific circuitry, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a frequency modulation receiver having discriminator means furnishing a discriminator output signal having a plurality of desired frequency signals in the absence of multipath reception and at least one harmonic of one of said desired frequency signals in the presence of multipath reception, the frequency of said harmonic differing from the frequencies of said desired frequency signals, an arrangement for furnishing an indicator signal indicative of said multipath reception, comprising, in combination, narrow bandwidth filtering means connected to said discriminator means for passing said harmonic when present, while rejecting signals of frequencies both higher and lower than said harmonic, thereby furnishing filtered harmonic signals occuring only during multipath reception, said narrow bandwidth filtering means comprising selective amplifier means tuned to a frequency between 15 kHv and 19 kHv; indicator means connected to said narrow bandwidth filtering means for furnishing said indicator signal in response to said filtered harmonic signals; further comprising rectifier means connected to said narrow bandwidth filtering means, for furnishing a pulse sequence in response to said filtered harmonic signals; and converter means connected between said rectifier means and said indicator means for converting said pulse sequence into a substantially constant voltage for activating said indicator means.

2. An arrangement as set forth in claim 1, further comprising means for changing the amplification of said selective amplifier means as a function of mono or stereo reception.

3. In a frequency modulation receiver having discriminator means furnishing a discriminator output signal having a plurality of desired frequency signals in the absence of multipath reception and at least one harmonic of one of said desired frequency signals in the presence of multipath reception, the frequency of said harmonic differing from the frequencies of said desired frequency signals, an arrangement for furnishing an indicator signal indicative of said multipath reception, comprising, in combination, narrow bandwidth filtering means connected to said discriminator means for passing said harmonic when present, while rejecting signals of frequencies both higher and lower than said harmonic, thereby furnishing filtered harmonic signals occuring only during multipath reception; indicator means connected to said narrow bandwidth filtering means, for furnishing said indicator signals in response to said filtered harmonic signals; further comprising rectifier means connected to said narrow bandwidth filtering means, for furnishing a pulse sequence in response to said filtering harmonic signals; and converter means connected between said rectifier means and said indicator means for converting said pulse sequence into a substantially constant voltage for activating said indicator means, said converter means comprising pulse stretch means including monostable multivibrator means having a stable and an unstable state, and time constant means determining the time interval said monostable multivibrator means remain in said unstable state, and additional circuit means for restarting said time constant means in response to subsequent pulses in said pulse sequence thereby causing said monostable multivibrator means to remain in said unstable state for a time corresponding to the duration of said pulse sequence.

4. An arrangement as set forth in claim 3, wherein said monostable multivibrator means comprise a voltage source having a positive terminal and a ground terminal; a first transistor having an emitter connected to said positive terminal by means of a resistor; a collector connected to said ground terminal by means of a second resistor; a base connected to said positive terminal by means of a third resistor and further connected to a first output terminal by means of a fourth resistor; wherein said time constant means comprise a series-resistor circuit connected from said collector of said first transistor to said ground terminal and having a common point; and wherein said monostable multivibrator means further comprise a second transistor having an emitter connected to the emitter of said first transistor, a collector connected to said output terminal, and to said ground terminal via a fifth resistor, and a base connected to said common point via a sixth resistor.

5. In a frequency modulation receiver having discriminator means furnishing a discriminator output signal having a plurality of desired frequency signals in the absence of multipath reception and at least one harmonic of one of said desired frequency signals in the presence of multipath reception, the frequency of said harmonic differing from the frequencies of said desired frequency signals, an arrangement for furnishing an indicator signal indicative of said multipath reception, comprising, in combination, narrow bandwidth filtering means connected to said discriminator means for passing said harmonic when present, while rejecting signals of frequencies both higher and lower than said harmonic, thereby furnishing filtered harmonic signals occurring only during multipath reception; indicator means connected to said narrow bandwidth filtering means, for furnishing said indicator signals in response to said filtered harmonic signals; further comprising rectifier means connected to said narrow bandwidth filtering means for furnishing a pulse sequence in response to said filtered harmonic signals, said converter means comprising pulse stretch means including a charging capacitor, and further circuit means for discharging said capacitor rapidly in response to each pulse in said pulse sequence and charging said capacitor slowly in the absence of pulses in said pulse sequence; and converter means connected between said rectifier means and said indicator means for converting said pulse sequence into a substantially constant voltage for activating said indicator means.

6. An arrangement as set forth in claim 5, wherein said further circuit means comprise a detector circuit connected to receive said pulse sequence and having a detector output; a voltage source having a positive terminal and a ground terminal; an emitter-follower stage having a fourth transistor, said fourth transistor having a base connected to said detector output, a collector connected to said positive terminal, and an emitter connected to said ground terminal by means of a second resistor and further connected to said ground terminal by means of a third voltage divider means having a first voltage divider tap constituting a pulse stretch output terminal and a second voltage divider tap; wherein said charging capacitor is connected from said second voltage divider tap to said ground terminal; wherein said second voltage divider tap is connected to the emitter of said fourth transistor by means of a diode.

7. An arrangement as set forth in claim 6, wherein said detector circuit comprise a fifth transistor having a collector connected to said positive terminal by means of a ninth resistor, an emitter connected to said ground terminal by means of a tenth resistor, a base connected to said ground terminal by means of fourth voltage divider means having a voltage divider tap; and capacitor means coupling said voltage divider tap to the output of said collector filtering means.

* * * * *